United States Patent
Satarasinghe

[19]

[11] Patent Number: 6,026,301
[45] Date of Patent: *Feb. 15, 2000

[54] METHOD FOR HARD HANDOFF IN A CDMA CELLULAR ENVIRONMENT

[75] Inventor: Prasanna Jayaraj Satarasinghe, Plano, Tex.

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/767,682

[22] Filed: Dec. 17, 1996

[51] Int. Cl.$^7$ ..................................................... H04Q 7/22
[52] U.S. Cl. ............................ 455/436; 455/438; 455/443
[58] Field of Search ..................................... 370/331, 332, 370/333; 455/436, 438, 439, 443, 448, 445, 553, 440, 442

[56] References Cited

U.S. PATENT DOCUMENTS

| | | | |
|---|---|---|---|
| 5,313,489 | 5/1994 | Menich et al. | 375/1 |
| 5,345,467 | 9/1994 | Lomp et al. | 370/331 |
| 5,483,669 | 1/1996 | Barnett et al. | 455/436 |
| 5,594,718 | 1/1997 | Weaver, Jr. et al. | 455/437 |
| 5,649,000 | 7/1997 | Lee et al. | 370/331 |
| 5,666,356 | 9/1997 | Fleming et al. | 370/332 |
| 5,682,380 | 10/1997 | Park et al. | 370/331 |
| 5,697,055 | 12/1997 | Gilhousen et al. | 455/33.2 |
| 5,722,072 | 2/1998 | Crichton et al. | 455/437 |
| 5,754,542 | 5/1998 | Autl et al. | 455/553 |

FOREIGN PATENT DOCUMENTS

| | | |
|---|---|---|
| WO 96 12380 | 4/1996 | WIPO . |
| WO 97 43837 | 11/1997 | WIPO . |
| WO 97 44984 | 11/1997 | WIPO . |

OTHER PUBLICATIONS

Holcman et al: "CDMA Intersystem Operations" Proceedings of the Vehicular Technology Conference, Stockholm, Jun. 8–10, 1994, vol. 1, Conf. 44, pp. 590–594, Institute of Electrical and Electronics Engineers.

*Primary Examiner*—Edward F. Urban
*Assistant Examiner*—Thuan T. Nguyen
*Attorney, Agent, or Firm*—Haynes & Boone, L.L.P.

[57] ABSTRACT

A method for performing a hard handoff of a call from a first cell site of a CDMA cellular network to a target cell site of a second cellular network, such as an AMPS network or a second CDMA network. As a mobile unit operating in the first CDMA network moves toward the second cellular network, the first cell site uses two separate RTD thresholds for comparison with a measured RTD distance between the mobile unit and the first cell site. Handoff is initiated when the RTD distance exceeds the first RTD threshold and is completed when the RTD distance exceeds the second RTD threshold. If the first cell site is not co-located with a cell site of the second network, the first cell site utilizes receivers placed in the target cell site for handoff. If the first cell site is co-located with a second cell site of the second network, the second cell site of the second network is always the target cell site.

21 Claims, 6 Drawing Sheets

METHOD FOR HARD HANDOFF IN A CDMA CELLULAR ENVIRONMENT

TECHNICAL FIELD

The invention relates generally to code division multiple access ("CDMA") cellular telephone systems and, more particularly, to a method for performing a hard handoff of a call from a CDMA cellular telephone system to another cellular telephone system such as an advanced mobile phone service ("AMPS") cellular telephone system or another CDMA cellular telephone system utilizing a different operating frequency.

BACKGROUND OF THE INVENTION

A cellular telephone system serves a defined area by dividing the area into cells. Each cell is served by a single base station, or cell site, and each cell site is connected to a message switching center ("MSC") via appropriate hardware links. A mobile unit is connected to the MSC by establishing a radio frequency ("RF") link with a nearby cell site.

Currently, there are several different types of cellular access technologies for implementing a cellular telephone network, including, for example, code division multiple access, or "CDMA", and advanced mobile phone service, or "AMPS". In a CDMA network, a single radio frequency is used simultaneously by many mobile units and each mobile unit is assigned a "code" for deciphering its particular traffic on that frequency. In contrast, in an AMPS network, each mobile unit is assigned a different radio frequency on which to communicate.

Referring to FIGS. 1A–1D, it will be recognized that, as shown in FIG. 1A and as previously described, in order for a mobile unit such as a mobile unit 10 to communicate in a cellular telephone network such as a CDMA network 12, several links must be established. These links include an RF link 14 between the mobile unit 10 and a first cell site, such as a cell site A, and a hardware link 16 between the cell site and a mobile switching center ("MSC") 18. As shown in FIG. 1B, as the mobile unit 10 moves away from the cell site A, the RF link 14 weakens and will eventually become too weak to support communications between the cell site A and the mobile unit 10. As a result, the call in progress eventually disconnects, or is dropped. Clearly, this is not acceptable. Referring to FIGS. 1C and 1D, to avoid this result, when the mobile unit 10 crosses a cell boundary 20 into a second cell of the network 12, in this case the cell served by cell site B, a new communications path between the mobile unit 10 and the MSC 18 is established. Cell site B serves a bordering cell to that of cell site A because the two cells are adjacent to each other. The new communications path includes an RF link 22 and a hardware link 24 between the cell site B and the MSC 18. Therefore, at the cell boundary 20, the mobile unit 10 is directed to end communication with the cell site A and begin communication with the cell site B.

The situation in which a mobile unit ends communication with one cell site and begins communication with a second cell site is referred to as a "handoff". The specific example illustrated in FIGS. 1A–1D is referred to as a "hard handoff" because the link between the mobile unit 10 and the MSC 18 via the cell site A is broken before the link between the mobile unit and the MSC via the cell site B is established. Alternatively, a "soft handoff" occurs when a second link to the mobile unit 10 is established before the first link is broken. For example, a soft handoff occurs in a CDMA network when a call is passed from a first cell site to a second cell site wherein both cell sites operate on a common frequency.

Often, an AMPS cellular network already exists in an area in which a CDMA network is to be installed, in which case the CDMA network will often be overlaid on top of the AMPS network. As a result, one or more cell sites of the CDMA network are "co-located", or placed in a one-to-one overlay, with an equal number of cell sites of the AMPS network. In such a case, there may be situations in which it would be advantageous to effect the handoff of a call from a CDMA cell site to an AMPS cell site. For example, there may be areas that are covered by a cell site of the AMPS network that are not covered by a cell site of the CDMA network, due to different link/power-supply constraints between the two cell sites, slight differences in the location of the various cells, and holes, or nulls, in the CDMA network coverage due to topography and cell site planning. Such coverage holes in the CDMA network can degrade call quality and, at worst, result in dropped calls. In addition, many cellular service providers have existing in-building and/or underground AMPS network coverage. The RF propagation characteristics of an 800 MHz signal in an AMPS network may be able to penetrate such structures better than a 1900 MHz signal in a CDMA network; therefore, a call maintained by the CDMA network could lose quality or be dropped. Finally, because large urban areas are typically converted to CDMA before rural areas, the major highways between such areas will also be converted to CDMA to provide seamless coverage for travelers between such areas. However, as a mobile unit exits the highway, it also exits CDMA coverage area, eventually resulting in a call-in-progress being dropped.

Alternatively, two CDMA networks may be installed next to a each other, wherein the first CDMA network operates at a different frequency from the second CDMA network. In such a case, there may be situations in which it would be advantageous to effect the handoff of a call from a CDMA cell site in the first CDMA network to a CDMA cell site in the second CDMA network. For example, there may be areas that are covered by the second CDMA network that are not covered by the first CDMA network. Also, the second CDMA network may utilize a different frequency than that of the first CDMA network because of other frequency-based services located in the area of the second CDMA network.

In the foregoing cases, it would be beneficial to handoff a call from a CDMA network to a second cellular network once the call has degraded to a point at which it appears that the call will eventually be dropped. Currently, there are various methods for performing the hard handoff of a call from a CDMA network to the second network, including the use of pilot beacon transmitters or round trip delay ("RTD") measurements. When using the pilot beacon transmitter method, the cells of the second network that are adjacent to the CDMA network are each outfitted with a pilot beacon transmitter. When the mobile unit is leaving the CDMA network, a determination is made as to which of the signals from the pilot beacon transmitters is strongest. The pilot beacon transmitter with the strongest signal represents a target cell of the second network that should receive the handoff. When using the RTD measurement method, complex target selection mechanisms chart the location of the mobile unit and determine when and where to handoff.

Such conventional handoff methods typically present numerous difficulties. For one, the pilot signal transmitters are very expensive. In addition, the transmission of additional signals by the pilot beacon transmitters relates to increased interference and performance degradation problems. Furthermore, the conventional RTD measurement method requires for extremely complex mechanisms for determining when to begin handoff, the handoff thereby being unrelated to any of the cell boundaries. Further still, CDMA network service providers would like to maintain a call within the CDMA network as long as possible, rather than handing it off to the second network too soon. Handing off a call too soon results in lost revenue for the CDMA network service provider, while waiting too long to do so will likely result in an decrease in call quality and an increase in dropped calls, both of which result in an increase in customer complaints.

Therefore, what is needed is an improved system and method for triggering hard handoff of a call from a first CDMA network to an AMPS network or a second CDMA network.

SUMMARY OF THE INVENTION

The present invention, accordingly, provides a method for triggering a hard handoff of a call between a mobile unit and a cell site of a CDMA cellular network to a second cell site of a second cellular network, such as an AMPS network or a second CDMA network.

To initiate and execute handoff from the CDMA cell site to the second cell site, two separate round-trip delay ("RTD") thresholds are defined based on the existing cell boundaries between the cell served by the CDMA cell site and the bordering cells of the second cellular network. These RTD thresholds are used for comparison with an RTD value representing a measured distance between a mobile unit making the call and the cell site serving the call, in this case the CDMA cell site. Both of the RTD thresholds represent areas that are totally inside the cell served by the CDMA cell site and that do not overlap the bordering cells of the second cellular network, wherein the first RTD threshold is smaller than the second. Handoff is initiated when the measured RTD value exceeds the first RTD threshold and is executed when the measured RTD value exceeds the second RTD threshold.

In one embodiment, if the CDMA cell site is co-located with the second cell site of the second network, the CDMA cell site first tries to keep the call in the CDMA network. If this cannot be achieved, before the mobile unit leaves the CDMA cellular network, the CDMA cell site performs a hard hand-off to the co-located second cell site. To determine when to initiate and execute handoff, the CDMA cell site repeatedly measures the RTD value of the mobile unit. As the mobile unit moves around the CDMA cell, it measures pilot signals from one or more cell sites operating on the same frequency used by the CDMA cell site and communicates these measured pilot signals to the CDMA cell site. The CDMA cell site then commands the mobile unit to add the pilot signals to an active pilot list. When the RTD value exceeds the first RTD threshold, the CDMA cell site reviews the active pilot list to determine if any other cell sites in the CDMA network are available for handoff. In this way, the call can be kept in the CDMA network as long as possible. When the measured RTD value exceeds the second RTD threshold, if the active pilot list designates another cell site in the CDMA network, the CDMA cell site performs a soft handoff to that cell site and no further action is required. If the active pilot list does not designate another cell site in the CDMA network, the CDMA cell site performs a hard handoff to the co-located second cell site of the second network. Because the second RTD threshold is before the earliest boundary of the border cells, the second cell site can then perform a conventional handoff to one of the border cell sites of the second cellular network.

Another embodiment is used when the CDMA cell site is not co-located with the second cell site of the second cellular network, but the second cell site instead serves a border cell of the second network. In this embodiment, receivers are placed in each border cell site of the second cellular network, including the second cell site. Whenever the mobile unit exceeds the first RTD threshold, the CDMA cell site activates the receivers by providing them with a code that identifies the mobile unit. After the mobile unit exceeds the second RTD threshold and a determination has been made that no other cell sites in the CDMA network are available for handoff, the CDMA cell site polls the receivers to select which is the best cell site with which to handoff, i.e., the second cell site. The CDMA cell site then performs a hard handoff to the second cell site.

In both embodiments, the CDMA cell site uses hysteresis when collecting the pilot signals. This is accomplished when the mobile unit is measuring and collecting the pilot signals. When the mobile unit measures a pilot signal with a strength above a predefined limit, it reports a strength measurement for the signal to the CDMA cell site. The CDMA cell site compares the strength measurement to the predefined limit plus a hysteresis limit. If the strength measurement exceeds the sum of the predefined limit and the hysteresis limit, the cell site commands the mobile unit to add the corresponding pilot signal to the active pilot list. This process is continually repeated. However, whenever one of the reported strength measurements becomes less than the predefined limit, the CDMA cell site commands the mobile unit to remove the corresponding pilot signal from the active pilot list. In this way, pilot signals are not constantly being added and removed from the active pilot list when their corresponding signal strength is at or near the predefined limit.

A technical advantage achieved with the invention is that in a CDMA network that has cell sites co-located with those from a second cellular network, before a mobile unit leaves the CDMA network and reaches a border cell of the second network that is not co-located with a CDMA cell site, hand off is executed to one of the co-located cell sites of the second network. As a result, the existing cell boundaries of the second network are sufficiently utilized.

Another technical advantage achieved with the invention is that no pilot beacon transmitters are required for handoff to a second network, thereby saving cost and preventing performance degradation due to interference caused by the transmitters.

Yet another technical advantage achieved with the invention is that a call is kept in the originating CDMA network as long as possible, thereby maximizing the CDMA network's capacity.

DESCRIPTION OF THE PREFERRED EMBODIMENT

FIGS. 1A–1D illustrate hard handoff of a call in a cellular telephone network, as described in detail above.

Figure 1A:
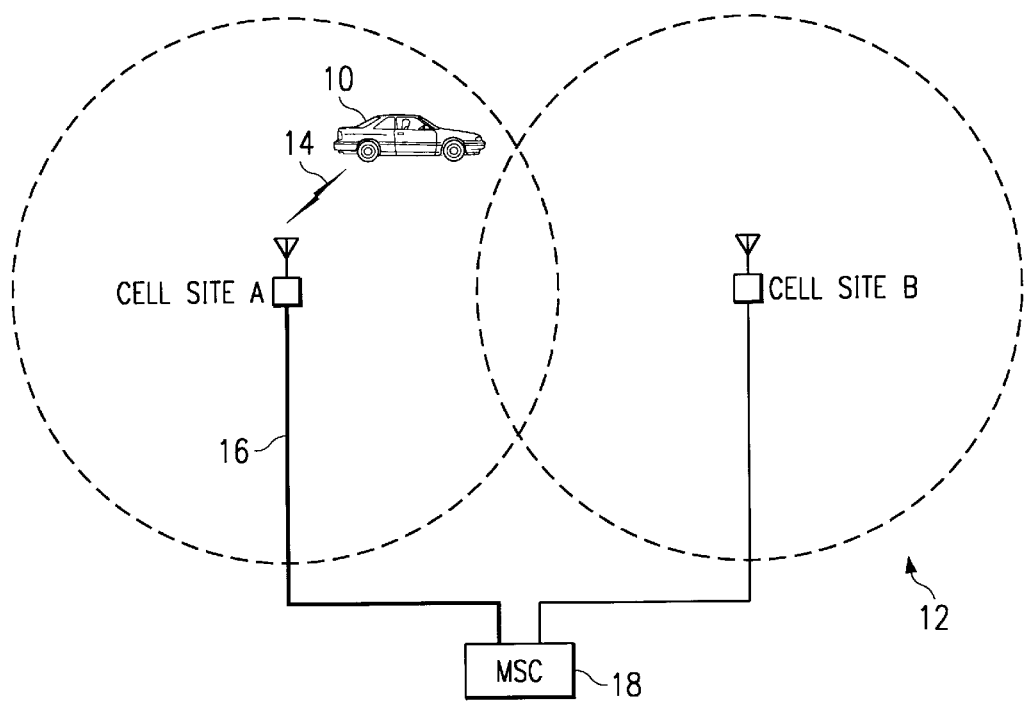
FIGS. 1A–1D illustrate hard handoff of a call in a cellular telephone network.
Figure 1B:
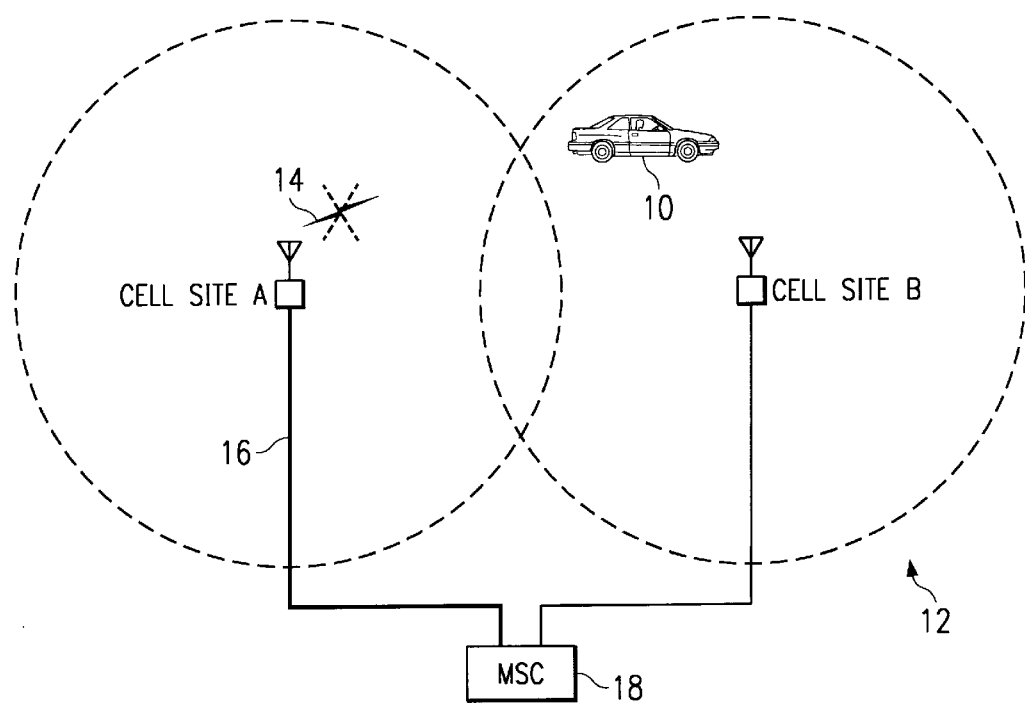
Figure 1C:
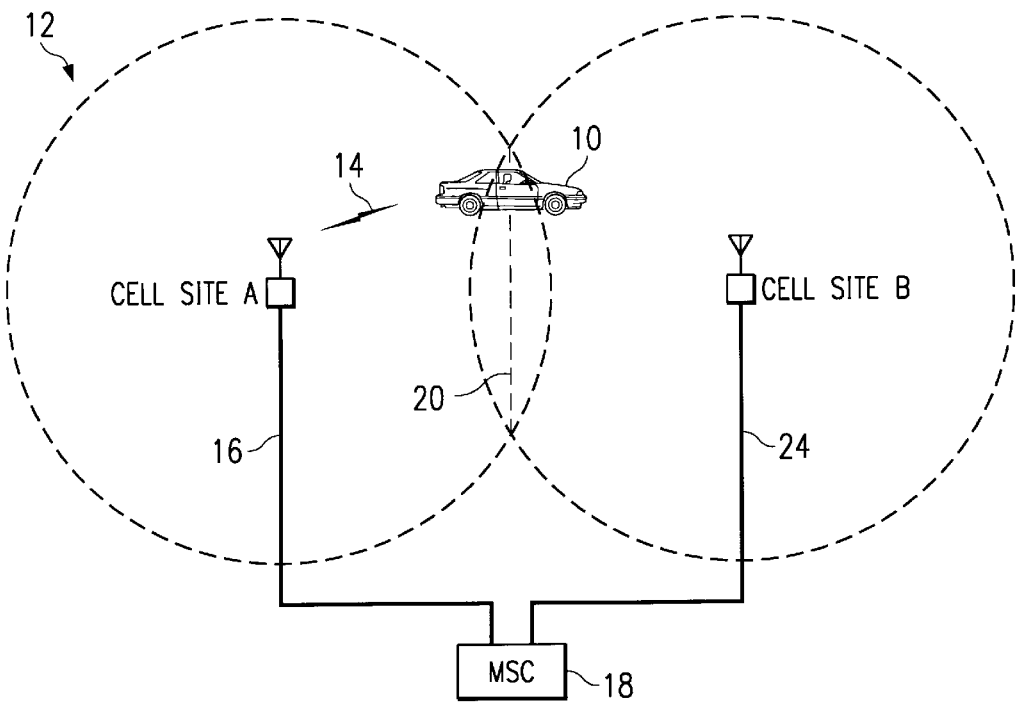
Figure 1D:
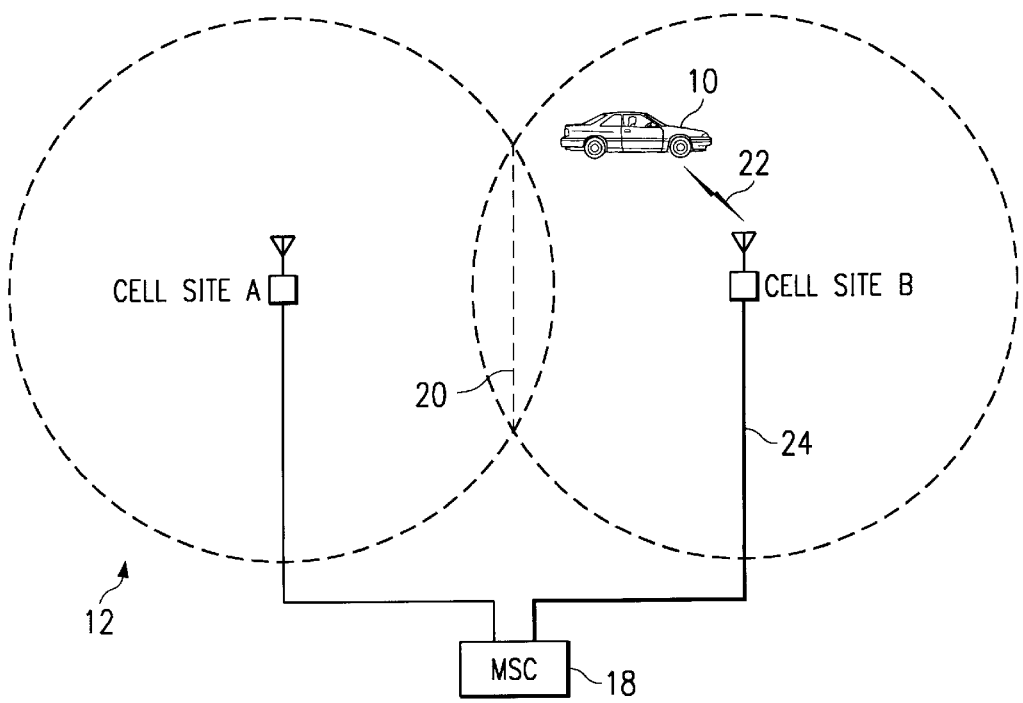
Figure 2A:
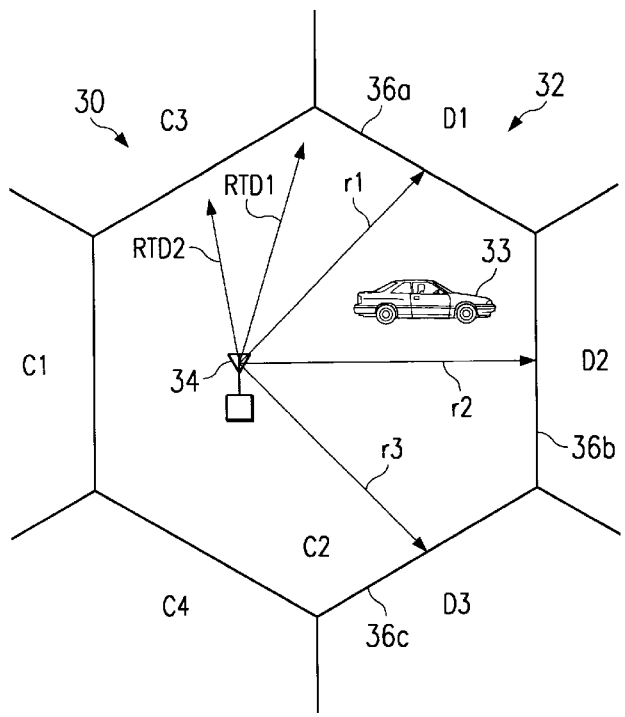
FIG. 2A illustrates multiple cells of a CDMA cellular network and a second cellular network.

Referring to FIG. 2A, the reference numeral 30 designates a CDMA cellular telephone network operating on a common frequency. The CDMA network 30 includes many different CDMA cells, such as the cells C1, C2, C3 and C4. A second cellular telephone network, designated by the reference numeral 32, may be an AMPS network or a second CDMA network operating on a frequency different from that used by the first CDMA network, as discussed in greater detail below. The second network 32 includes border cells D1, D2, D3 as well as other cells not shown. The network 32 is adjacent to the CDMA network 30 at the cells C2, C3, and C4, and may have one or more cell sites co-located with the cell sites in the CDMA network 30, also discussed in greater detail below. For the sake of example, a mobile unit 33 is presently located in the cell C2 of the CDMA network 30.

Located in a central area of the cell C2 is a base station, or cell site 34. The cell site 34 utilizes two thresholds values, RTD1 and RTD2, for performing a handoff from the cell site. Considering distances r1, r2, r3, which represent the shortest distances between the cell site 34 and cell boundaries 36a, 36b, 36c, respectively of the cells D1, D2, D3, respectively, the threshold values RTD1, RTD2 are defined such that:

RTD2<r1, r2, and r3; and

RTD1<RTD2. Although the cell boundaries 36a, 36b, 36c are shown as hexagonal in shape, it is understood that the cell site 34 serves an area that is relatively circular, as described in FIGS. 1A–1D. In addition, if the cell site 34 is co-located with an overlaid cell site (not shown) from the second cellular network, the cell boundaries 36a, 36b, 36c also represent the handoff location from the overlaid cell site to the cells D1, D2, D3, respectively.

Figure 2B:
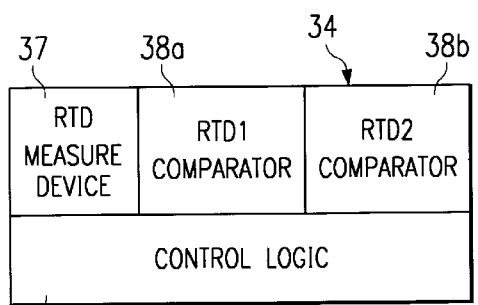
FIG. 2B is a block diagram of a cell site of one CDMA cell of FIG. 2A.

Referring also to FIG. 2B, the cell site 34 includes a conventional measurement device 37 that measures a RTD value (not shown) representing a distance of the mobile unit from the cell site. While the mobile unit 33 is in the C2 cell, the measurement device 37 continually measures the RTD value. The cell site 34 also includes first and second comparators 38a, 38b, respectively for comparing the measured RTD value with the RTD1 and RTD2 thresholds, respectively. The threshold RTD1 represents a distance from the cell site 34 when handoff is to be initiated and the threshold RTD2 represents a distance from the cell site when the handoff is to be executed. In addition, the cell site 34 includes control logic 39 for determining a target cell with which to handoff, and for running routines to implement one or more handoff methods, discussed in greater detail below.

The control logic 39 utilizes a RTD pilot handoff list ("RTDPLIST", not shown). The RTDPLIST provides a list of the adjacent cell sites that operate on the same common frequency as the cell site 34, e.g., the cell sites serving the cells C1, C3 and C4. Although the measurement device 37, first and second comparators 38a, 38b, and control logic 39 are illustrated as part of the cell site 34, it is understood that some or all of these components may alternatively be located in different locations and/or devices, such as a message switching center (not shown) connected to the cell site.

Figure 2C:
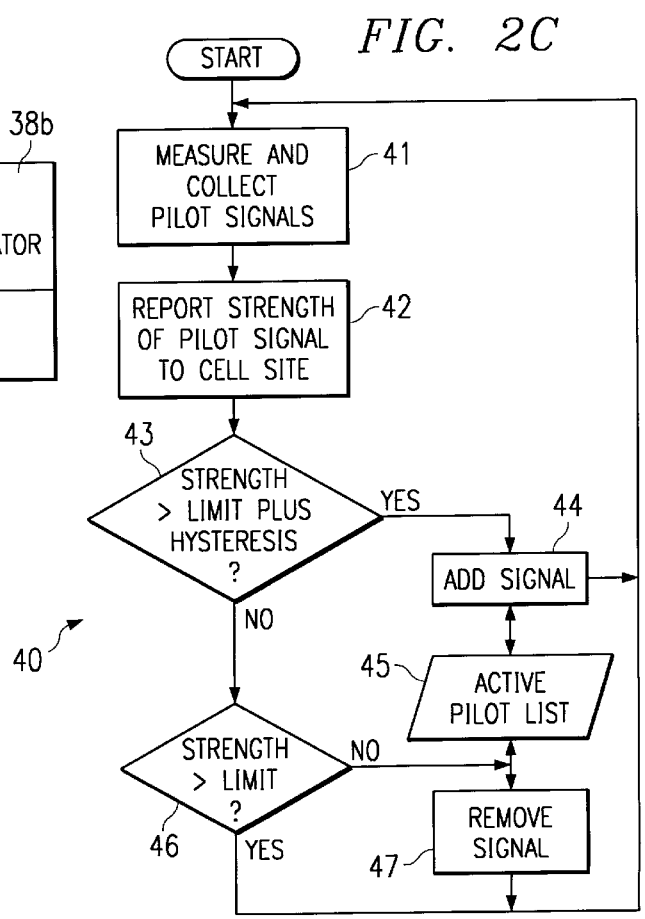
FIG. 2C is a flowchart of the operation of a pilot signal routine for selecting potential target cell sites from the CDMA cellular network of FIG. 2A.

Referring to FIG. 2C, a pilot signal routine 40 is described for selecting potential target cell sites with which the cell site 34 may handoff a call from the mobile unit 33. The pilot signal routine 40 is repeatedly performed by the mobile unit 33 and the cell site 34. At step 41, as the mobile unit 33 is traveling inside the cell C2, it attempts to measure and collect pilot signals from cells operating on the common frequency used by the cell site 34. Because the cells D1, D2, D3 in the second network 32 do not operate on the common frequency, the cell sites for cells D1–D3 will never be detected by the mobile unit. However, if the mobile unit 33 moves toward cell sites of the CDMA network 30, such as the cell site for the C3 cell, it will detect a pilot signal (not shown) from that site. At step 42, the mobile unit 33 reports a strength measurement value (not shown), corresponding to the measured pilot signal, to the cell site 34. At step 43, the cell site 34 compares the strength measurement value with the predefined limit plus a hysteresis value. If the strength measurement value exceeds the predefined limit plus the hysteresis value, execution proceeds to step 44, where the cell site 34 commands the mobile unit 33 to add the corresponding pilot signal to an active pilot list 45 of potential cells, the list being stored inside the mobile unit 33. Execution then returns to step 41.

If at step 43, the strength measurement value does not exceed the predefined limit plus the hysteresis value, execution proceeds to step 46, where the strength measurement value is compared to the predefined limit, alone. If the strength measurement value exceeds the predefined limit, execution returns to step 41. Otherwise, execution proceeds to step 47, where the cell site 34 commands the mobile unit 33 to remove the corresponding pilot signal from the active pilot list 45. In this way, pilot signals are not constantly being added and removed from the active pilot list 45 when their signal strength is at or near the predefined limit. At times, the active pilot list 45 may contain only the pilot signal from the cell site 34, and at other times the list may contain more than one pilot signal, representing several potential target cell sites in the CDMA network.

Figure 3:
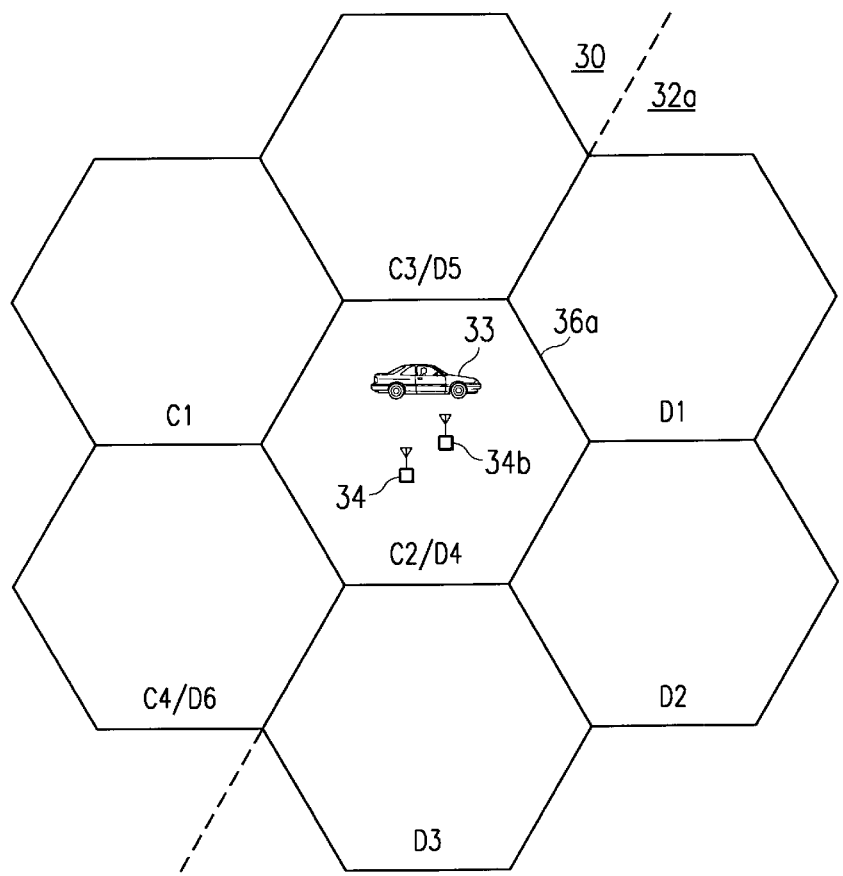
FIG. 3 illustrate the cells of FIG. 2A wherein the second cellular network is an AMPS network with all the boundary cell sites of the AMPS network co-located with cell sites of the CDMA network.
Figure 5:
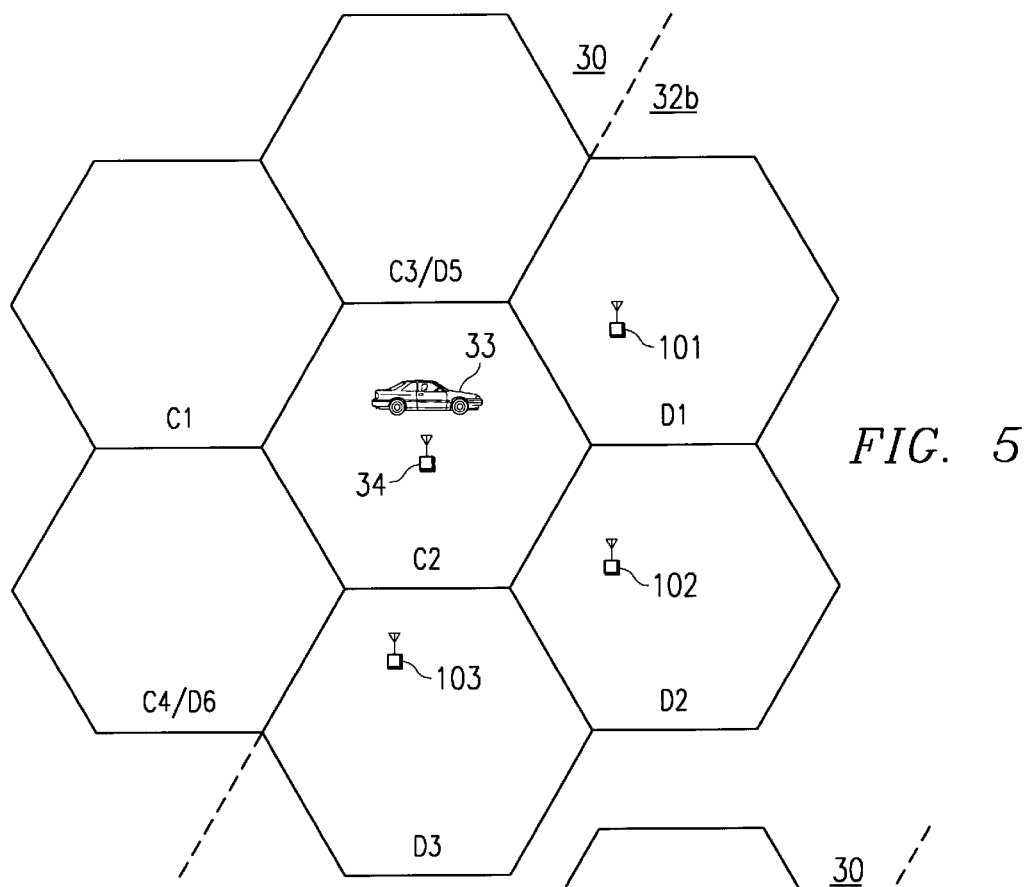
FIG. 5 illustrates the cells of FIG. 2A wherein the second cellular network is an AMPS network with only some of the boundary cell sites of the AMPS network co-located with cell sites of the CDMA network.
Figure 7:
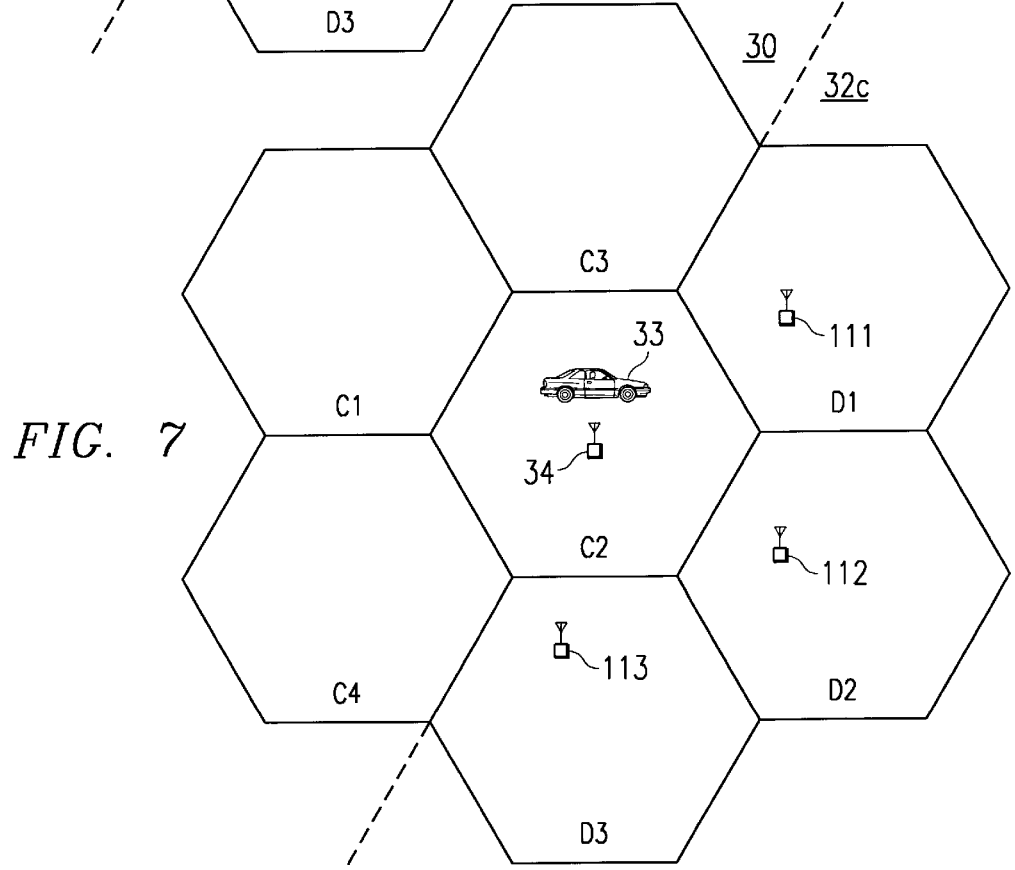
FIG. 7 illustrates the cells of FIG. 2A wherein the second cellular network is a second CDMA network.

The configuration of the second network 32 can be one of many different types. FIG. 3 illustrates the second network as an AMPS network 32a with an AMPS cell site 34b co-located with the CDMA cell site 34; FIG. 5 illustrates the second network as an AMPS network 32b without an AMPS cell site co-located with the CDMA cell site 34; and FIG. 7 illustrates the second network as a second CDMA network 32c.

Referring to FIG. 3, the AMPS network 32a includes cell sites for border cells D1, D2 and D3 as well as cell sites for cells D4, D5 and D6 co-located with cell sites for cells C2, C3 and C4, respectively. For example, the cell site 34 serving the CDMA cell C2 is co-located with a cell site 34b serving the AMPS cell D4. In this configuration, potential target cells include all the CDMA cells of the CDMA network 32 and the D4 cell of the AMPS network. Handoff from the cell site 34 to one of the cell sites serving the other cells of the CDMA network is straight forward. If no other CDMA cell site is available for handoff, the cell site 34 performs a handoff to the cell site 34b, as discussed in greater detail below.

Figure 4:
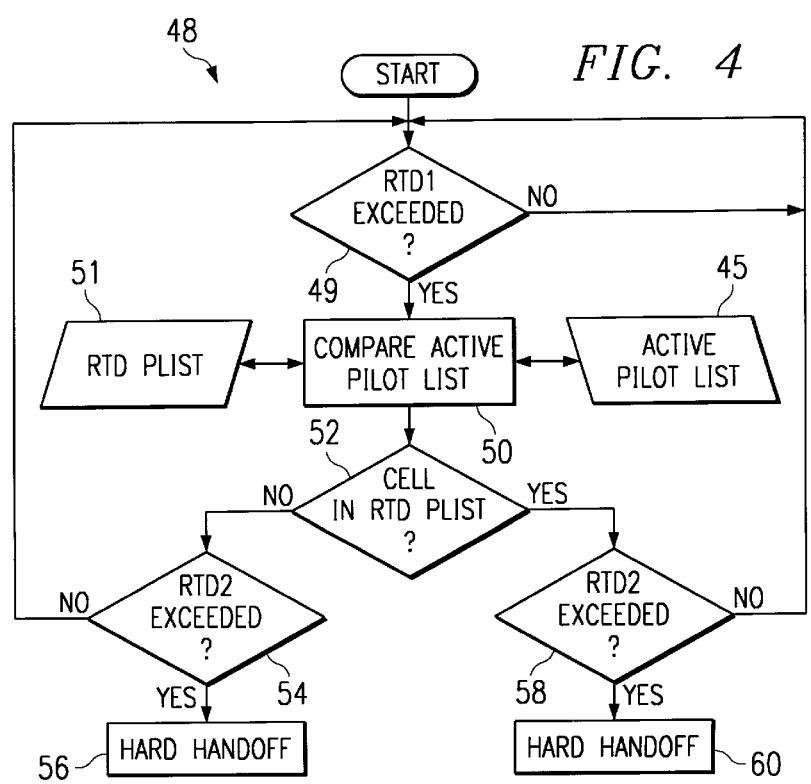
FIG. 4 is a flowchart of the operation of the present invention for providing hard handoff of a call from a CDMA cell site of the CDMA network to an AMPS cell site of the AMPS network, all of FIG. 3.

Referring to FIG. 4, a handoff routine 48 is described for selecting the target cell site in the network configuration of FIG. 3 and performing the handoff from the cell site 34 to the target cell site. At step 49, the cell site 34 compares the measured RTD value with the RTD1 threshold. As the mobile unit 33 moves further from the cell site 34, the measured RTD value will exceed the RTD1 threshold. If the cell site 34 determines that the measured RTD value does not exceed the RTD1 threshold, execution returns to step 42. If the cell site 34 determines that the measured RTD value does exceed the RTD1 threshold, execution proceeds to step 50. At step 50, the cell site 34 compares the active pilot list 45 to the RTDPLIST 51.

At step 52, a determination is made as to whether the active pilot list 45 contains any pilot signals in the RTDPLIST 51. If not, the determination indicates that the mobile unit 33 is moving away from the CDMA network 30, i.e., not in the direction of cells C3, C1 or C4, and execution proceeds to step 54. At step 54, the cell site 34 checks to see if the measured RTD value exceeds the RTD2 threshold. If not, execution returns to step 49. If the measured RTD value does exceed the RTD2 threshold, execution proceeds to step 56, where the cell site 34 performs a hard handoff to the cell site 34b of the co-located AMPS cell D4. The mobile unit 33 is now in the AMPS network 32a and can be conventionally handed off to the target cell site of the AMPS network 32a.

If at step 52 the active pilot list 45 does contain a pilot signal in the RTDPLIST 51, execution proceeds to step 58. At step 58, the cell site 34 checks to see if the measured RTD value exceeds the RTD2 threshold. If not, execution returns to step 49. If the measured RTD value does exceed the RTD2 threshold, execution proceeds to step 60, where the cell site 34 performs a soft handoff to the target cell site of the CDMA network 30 that is designated by the active pilot list 45 and the RTDPLIST 51.

Referring to FIG. 5, the AMPS network 32b includes cell sites for border cells D1, D2, and D3 as well as cell sites for cells D5, D6 co-located with cell sites for cells C3, C4, respectively. However, the CDMA cell site 34 does not have a co-located AMPS cell site. In this configuration, the AMPS cell sites serving the border cells D1, D2, and D3 are each outfitted with CDMA receivers 71, 72, 73, respectively, to facilitate selection of the target cell site. The receivers 101, 102, 103 are in direct communication with the cell site 34 through communication links (not shown) such as conventional land-line or microwave transmission devices. Also, a hard handoff list ("HHLIST") of the border AMPS cell sites with which the C2 cell can perform a hard handoff, which in the present example includes cells D1, D2, and D3, is included in the cell site 34, as discussed in greater detail below.

Figure 6:
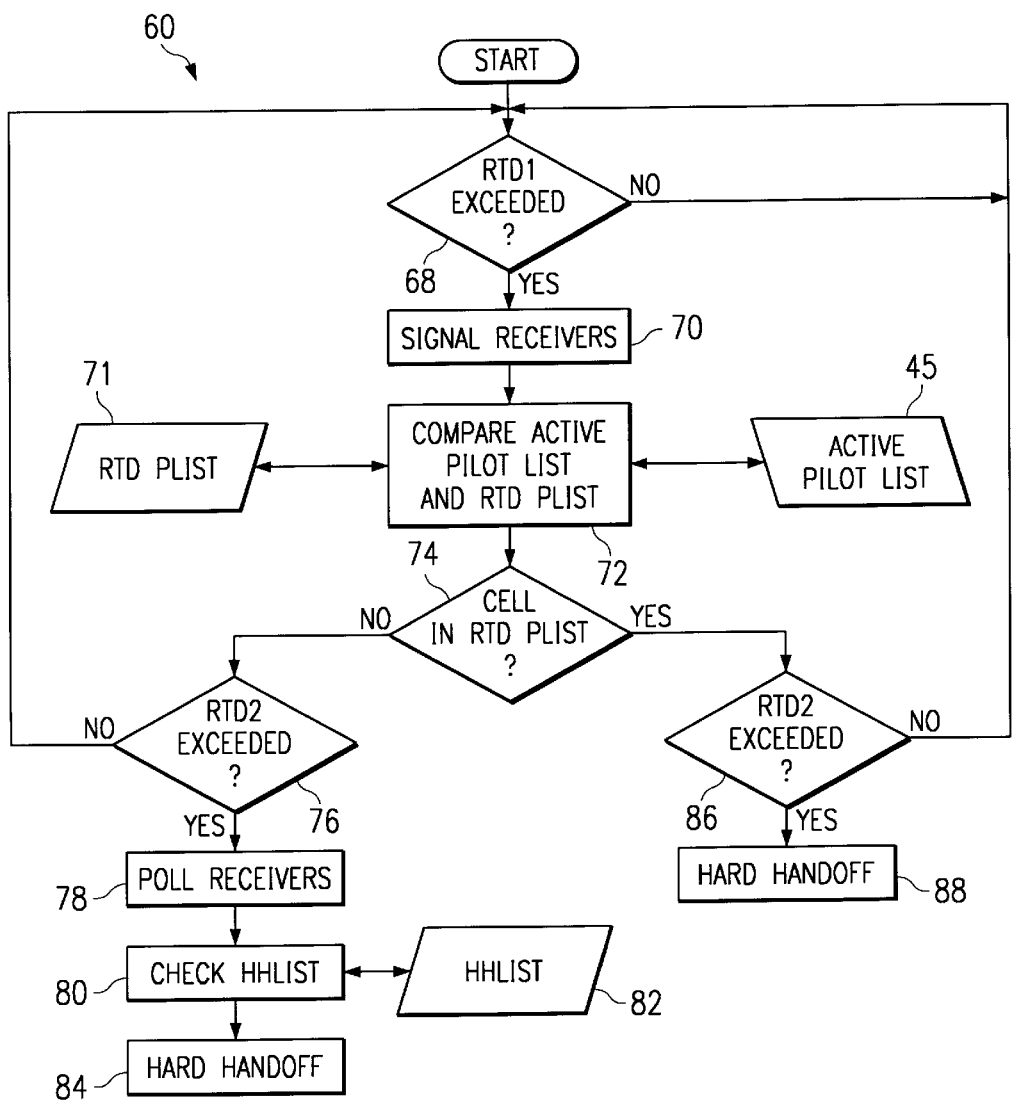
FIG. 6 is a flowchart of the operation of the present invention for providing hard handoff of a call from a CDMA cell site of the CDMA network to an AMPS cell site of the AMPS network, all of FIG. 5.

Referring to FIG. 6, a handoff routine 60 is utilized for selecting the target cell site in the network configuration of FIG. 5 and performing the handoff from the cell site 34. At step 68, the cell site 34 compares the measured RTD value for the mobile unit 33 with the RTD1 threshold. If the cell site 34 determines that the measured RTD value exceeds the RTD1 threshold, execution proceeds to step 70. At step 70, the cell site 34 instructs the receivers 101, 102, 103 to start decoding signals coming from the mobile unit 33 by providing the receivers with a code (not shown) associated with the mobile unit 33. At step 72, the cell site 34 compares the active pilot list 66 to the RTDPLIST 71.

At step 74, a determination is made as to whether the active pilot list 66 contains any pilot signals in the RTDPLIST 71, as described above. If not, execution proceeds to step 76 in which the cell site 34 checks to see if the measured RTD value exceeds the RTD2 threshold. If the measured RTD value does not exceed the RTD2 threshold, execution returns to step 68. If the measured RTD value does exceed the RTD2 threshold, execution proceeds to step 78, where the cell site 34 polls the receivers 101, 102, 103 to determine which is receiving the strongest signal from the mobile unit 33. At step 80 the cell site compares the responses from the receivers 101, 102, 103 to the HHLIST 82. The cell site 34 then determines the target cell of the AMPS network 32b with which to perform a hard handoff, eg., the D1 cell. At step 84 the cell site 34 performs a hard handoff to the target cell. The mobile unit 33 is now in the AMPS network 32b.

If at step 74 the active pilot list does contain a pilot signal in the RTDPLIST 71, execution proceeds to step 86. At step 58, the cell site 34 checks to see if the measured RTD value exceeds the RTD2 threshold. If not, execution returns to step 68. If the measured RTD value does exceed the RTD2 threshold, execution proceeds to step 88, where the cell site 34 performs a soft handoff to the target cell site of the CDMA network 30.

Referring to FIG. 7, the network 32c represents a second CDMA network (hereinafter CDMA2) which operates at a frequency different from that of the CDMA network 30. In addition, there are no co-located cell sites between the two networks 30, 32c. The CDMA2 cell sites serving border cells D1, D2, D3 are each outfitted with CDMA receivers 111, 112, 113, respectively, each linking to the cell site 34 to facilitate hard handoff target selection. In actuality, the links (not shown) for connecting the cell site 34 and the receivers 111, 112, 113 already exist, i.e., links at the corresponding cell sites of the CDMA2 cells D1, D2, D3, so that the only additional requirement is to connect new receivers to the links. The receivers 111, 112, 113 are thereby in direct communication with the cell site 34. The handoff routine 61 of FIG. 6 is also utilized with the network configuration of FIG. 7 for selecting the target cell site in the CDMA2 network 32c and performing the handoff from the cell site 34.

As a result, the preferred embodiment provides a universal CDMA hard handoff scheme that does not require extra transmitters and does not add extra signal interference to the CDMA network 30, unlike the conventional pilot beacon transmitter based solutions. In the configuration of adjacent CDMA and AMPS networks where the two networks include co-located cell sites, no extra hardware is required. In the configurations of adjacent CDMA and CDMA2 networks or CDMA and AMPS networks where the boundary region between the two networks does not include co-located cell sites, signal receivers linked to the CDMA network are required. Such hardware is less expensive and less complicated than the transmitter configurations of the pilot beacon transmitter based solutions, and in the configuration with the CDMA2 network, the links already exist.

Although illustrative embodiments of the invention have been shown and described, other modifications, changes, and substitutions are intended in the foregoing disclosure. For example, the detailed description describes handoff from a CDMA network to an AMPS network, whereas different types of networks can readily use the invention. Accordingly, it is appropriate that the appended claims be construed broadly and in a manner consistent with the scope of the invention.

What is claimed is:

1. In a CDMA cellular network overlaid on an AMPS cellular network, a method for performing a handoff of a call from a mobile unit in a CDMA cell site of the CDMA cellular network wherein the CDMA cell site is co-located with an AMPS cell site of the AMPS cellular network, the method comprising the steps of:

measuring a round trip delay ("RLTD") value representing a distance from the mobile unit to the CDMA cell site;

comparing the RTD value with a first predetermined value;

if the RTD value exceeds the first predetermined value, determining whether any other CDMA cell site is available for handoff;

comparing the RTD value with a second predetermined value;

if the RTD value exceeds the second predetermined value, handing off the call to a second CDMA cell site if one is available; and if no other CDMA cell site is available for handoff, handing off the call to the AMPS cell site.

2. The method of claim 1 wherein the first predetermined value is an RTD threshold representing a distance from the CDMA cell site area within specific boundaries of the AMPS cell site.

3. The method of claim 2 wherein the specific boundaries of the AMPS cell site are boundaries between the AMPS cell site and other cell sites of the AMPS cellular network that are adjacent to the AMPS cell site but not co-located with cell sites from the CDMA cellular network.

4. The method of claim 1 wherein the first and second predetermined values are RTD thresholds representing a first and second radius, respectively, from the CDMA cell site defining a first and second area, respectively, completely served by the AMPS cell site such that the second radius is less than the first radius.

5. The method of claim 1 wherein the step of determining whether any other CDMA cell site is available for handoff includes the following:

receiving a pilot signal from any other CDMA cell site;

detecting a strength of the pilot signal;

comparing the strength of the pilot signal to a predefined limit;

adding the pilot signal to an active pilot list if the strength of the pilot signal exceeds the sum of the predefined limit and a hysteresis limit; and after adding the pilot signal to the active pilot list, removing the pilot signal from the active pilot list if the strength of the pilot signal falls below the predefined limit.

6. In a first cellular network bordering an second cellular network, a method for handing off a call from a mobile unit being served by a first cell site and approaching a second cell site, where the first cell site is a border cell site of the first cellular network and the first cell site is co-located with a third cell site of the second cellular network, the method comprising the steps of:

repeatedly measuring a round trip delay ("RTD") value representing a distance from the unit to the first cell site of the call;

comparing the RTD value with a first predetermined value;

if the RTD value exceeds the first predetermined value, determining if the second cell site is in the first network;

comparing the RTD value with a second predetermined value; and if the RTD value exceeds the second predetermined value and the second cell site is not in the first network, performing a handoff to the third cell site so that the third cell site may perform a handoff to the second cell site.

7. The method of claim 6 further comprising the step of:

if the measured parameter exceeds the second predetermined value and the second cell site is in the first network, performing a handoff to the second cell site.

8. The method of claim 7 wherein the step of determining if the second cell site is in the first network comprises:

collecting and measuring a pilot signal from the second cell site;

comparing the measured pilot signal to a predefined limit; and if the pilot signal exceeds the predefined limit, determining that the second cell site is in the first network.

9. The method of claim 7 wherein the first predetermined value is an RTD threshold representing a radius from the first cell site defining an area completely served by both the first and third cell sites.

10. In a first cellular network bordering a second cellular network, a method for handing off a call from a first cell site to a second cell site, wherein the first cell site serves a border cell of the first cellular network and the second cell site serves a border cell of the second network, the method comprising the steps of:

repeatedly measuring a round trip delay ("RTD") value representing a distance from a mobile unit making the call to the first cell site of the call;

comparing the RTD value with a first predetermined value;

if the RTD value exceeds the first predetermined value, providing a code identifying the call to a receiver at the second cell site;

comparing the RTD value with a second predetermined value; and if the RTD value exceeds the second predetermined value, polling the receiver to determine if the receiver has detected the call and if so, performing a handoff to the second cell site.

11. The method of claim 10 further comprising the steps of:

receiving a pilot signal from a third cell site;

determining whether the third cell site is in the first cellular network; and if the measured parameter exceeds the second predetermined value and the third cell site is in the first cellular network, performing a handoff to the third cell site instead of the second cell site.

12. The method of claim 11 wherein the step of receiving a pilot signal includes the following:

detecting a strength of the pilot signal;

comparing the strength of the pilot signal to a predefined limit;

adding the pilot signal to an active pilot list if the strength of the pilot signal exceeds the sum of the predefined limit and a hysteresis limit; and removing the pilot signal from the active pilot list if the strength of the pilot signal is less than the predefined limit.

13. The method of claim 10 wherein the first cellular network is a first CDMA network and the second cellular network is a second CDMA network operating on a different frequency than the first CDMA network.

14. The method of claim 10 wherein the first cellular network is a CDMA network and the second cellular network is an AMPS network.

15. In a CDMA cellular network overlaid on an AMPS cellular network, an apparatus for performing a handoff of a call from a mobile unit in a CDMA cell site of the CDMA cellular network wherein the CDMA cell site is co-located with an AMPS cell site of the AMPS cellular network, the apparatus comprising:

means for measuring a round trip delay ("RTD") value representing a distance from the mobile unit to the CDMA cell site of the call;

means for comparing the RTD value with a first predetermined value;

means responsive to when the RTD value exceeds the first predetermined value, for handing off the call to a second CDMA cell site if one is available and if no other CDMA cell site is available for handoff, for handing off the call to the AMPS cell site.

means for comparing the RTD value with a second predetermined value before comparing the RTD value with the first predetermined value; and means responsive to the RTD value exceeding the second predetermined value for determining whether any other CDMA cell site is available for handoff.

16. The apparatus of claim 15 wherein the first predetermined value is an RTD threshold representing a distance from the CDMA cell site area within specific boundaries of the AMPS cell site.

17. The apparatus of claim 16 wherein the specific boundaries of the AMPS cell site are boundaries between the AMPS cell site and other cell sites of the AMPS cellular network that are adjacent to the AMPS cell site but not co-located with cell sites from the CDMA cellular network.

18. The apparatus of claim 15 wherein the first and second predetermined values are RTD thresholds representing a first and second radius, respectively, from the CDMA cell site defining a first and second area, respectively, completely served by the AMPS cell site such that the second radius is less than the first radius.

19. The apparatus of claim 15 wherein the means for determining whether any other CDMA cell site is available for handoff includes:

means for receiving a pilot signal from other CDMA cell sites;

means for measuring a strength of the detected pilot signal;

means for comparing the measured strength of the detected pilot signal to a predefined limit;

means for adding the detected pilot signal to an active pilot list if the measured strength exceeds the sum of the predefined limit and a hysteresis limit; and means for removing the detected pilot signal from the active pilot list if the strength of the pilot signal falls below the predefined limit.

20. In a first cellular network bordering a second cellular network, a first cell site for serving a call and supporting a handoff of the call, wherein the first cell site is co-located with a cell site of the second cellular network, the first cell site comprising:

a round trip delay ("RTD") measurement device for determining a RTD distance from a mobile unit making the call to the first cell site;

a first comparator for comparing the RTD with a first predetermined value;

selector logic, responsive to when the RTD distance exceeds the first predetermined value, for determining if a second cell site in the first cellular network is a potential cell site for handoff;

a second comparator for comparing the RTD distance with a second predetermined value; and handoff logic for handing off the call in response to the RTD exceeding the second predetermined value, wherein the handoff logic performs a handoff to the second cell site if the selector logic determined that the second cell site is a potential cell site for handoff and the handoff logic performs a handoff to the cell site of the second cellular network if the selector logic determined that the second cell site is not a potential cell site for handoff.

21. The first cell site of claim 20 wherein the first and second predetermined values are RTD thresholds representing a first and second radial distances, respectively, from the first cell site and wherein the first radial distance is less than the second radial distance, which is less than a distance from the first cell site to a handoff boundary used by the cell site of the second cellular network.

* * * * *